(12) United States Patent
Johnson

(10) Patent No.: US 7,080,463 B1
(45) Date of Patent: Jul. 25, 2006

(54) FOOD DRYING, MIXING AND SERVING APPARATUS

(76) Inventor: Robert A Johnson, 53 Route 37, New Fairfield, CT (US) 06812

( * ) Notice: Subject to any disclaimer, the term of this patent is extended or adjusted under 35 U.S.C. 154(b) by 41 days.

(21) Appl. No.: 10/910,972

(22) Filed: Aug. 4, 2004

(51) Int. Cl.
*A47J 43/24* (2006.01)

(52) U.S. Cl. .............................. 34/312; 34/58; 99/495; 366/247; 422/297

(58) Field of Classification Search ................. 34/312, 34/58; 99/495; 422/297; 366/247
See application file for complete search history.

(56) References Cited

U.S. PATENT DOCUMENTS

| | | | | |
|---|---|---|---|---|
| 1,019,538 | A | * | 3/1912 | Scott ............................ 422/297 |
| 1,448,296 | A | * | 3/1923 | Heath ........................... 209/283 |
| 2,782,622 | A | * | 2/1957 | Candor ............................ 68/25 |
| D257,713 | S | * | 12/1980 | Korach ......................... D7/540 |
| 4,360,118 | A | | 11/1982 | Stern |
| 5,169,231 | A | * | 12/1992 | Suzuki ......................... 366/105 |
| 5,372,274 | A | | 12/1994 | Freedland |
| 5,562,025 | A | * | 10/1996 | Bull et al. ..................... 99/495 |
| 5,944,417 | A | * | 8/1999 | Shiotani ...................... 366/220 |
| 6,018,883 | A | * | 2/2000 | Mulhauser ..................... 34/58 |
| D450,219 | S | | 11/2001 | Smith |
| 6,595,680 | B1 | * | 7/2003 | Sanpei et al. ................ 366/147 |
| 6,622,618 | B1 | | 9/2003 | Glucksman et al. |
| 2003/0106302 | A1 | * | 6/2003 | Ray ........................... 60/39.35 |
| 2004/0239000 | A1 | * | 12/2004 | Murphy et al. .............. 264/248 |

FOREIGN PATENT DOCUMENTS

| | | | |
|---|---|---|---|
| EP | 1 348 369 | * | 1/2003 |
| JP | 2001-245797 | * | 9/2001 |

* cited by examiner

*Primary Examiner*—S. Gravini
(74) *Attorney, Agent, or Firm*—David Kiewit

(57) ABSTRACT

A salad spinner and mixer may be made from two substantially identical transparent bowls that can be joined together at their rims to define a chamber; two substantially identical colanders that can be joined together at their rims and received within the chamber; and a bifurcated base that has a spindle on each of two parallel upstanding portions. When the spindles are received within dimples on the bottoms of the bowls, the bowl and colander assembly can be spun about an axis defined by the spindles to remove water from the salad ingredients. The bowl assembly, used without the colanders, can also be use to mix salad dressing with salad ingredients. The resultant salad can be served in one of the bowls. Moreover, the bifurcated base can serve as a napkin holder.

9 Claims, 2 Drawing Sheets

FOOD DRYING, MIXING AND SERVING APPARATUS

BACKGROUND OF THE INVENTION

1. Field of the Invention

The invention relates to apparatus for drying food by use of centrifugal forces, for treating food by mixing liquid and solid ingredients, and for serving food.

2. Background Information

Salad spinners for partially drying washed salad ingredients are well known and conventionally comprise a perforate bowl or colander retained within a waterproof vessel and arranged to be spun about a vertical axis so that centrifugal forces can expel superficial water from the ingredients. U.S. Pat. No. 6,622,618 is generally representative of such devices.

Various interlocking food containers are also generally known in the art and may comprise faceted bowls and colanders, as taught by Lipfert in U.S. Pat. No. 3,419,176.

Apparatus that combines salad mixing and salad serving functionality is taught by Smith in US D450,219.

BRIEF SUMMARY OF THE INVENTION

A preferred embodiment of the invention provides drying apparatus for removing superficial water from washed salad ingredients. This apparatus comprises two substantially identical transparent bowls having respective rims that, when joined together, define a first chamber; two substantially identical colanders that, when joined together and received within the first chamber, define a second chamber; and a bifurcated base comprising two parallel upstanding portions separated by a horizontal portion. The two bowls each have a common selected diameter perpendicular to an axis of rotation, and each has a spindle-receiving dimple on a respective bottom surface distal from its respective rim. The upstanding portions of the base each have a spindle portion receivable in one of the dimples.

In operation of this preferred embodiment as a salad spinner, freshly washed salad ingredients are captured between the two colanders that are then, in turn, captured between the two bowls in the first chamber. This assembly, comprising the pair of colanders and the pair of bowls, is then mated with the base by inserting the base spindles into respective dimples. The assembly is then spun about the axis of rotation extending between the two dimples so that centrifugal forces can act to remove a substantial portion of the superficial water from the salad ingredients.

Portions of the preferred apparatus can also be used to toss a salad by placing salad ingredients and salad dressing in the first chamber between the two bowls, mating the assembly of two bows to the base and spinning it about the axis in a operation that is similar to the spin-drying operation, save for the absence of the colanders. Moreover, after a salad has been tossed, it can be served in one of the two bowls.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF THE INVENTION

Figure 1:
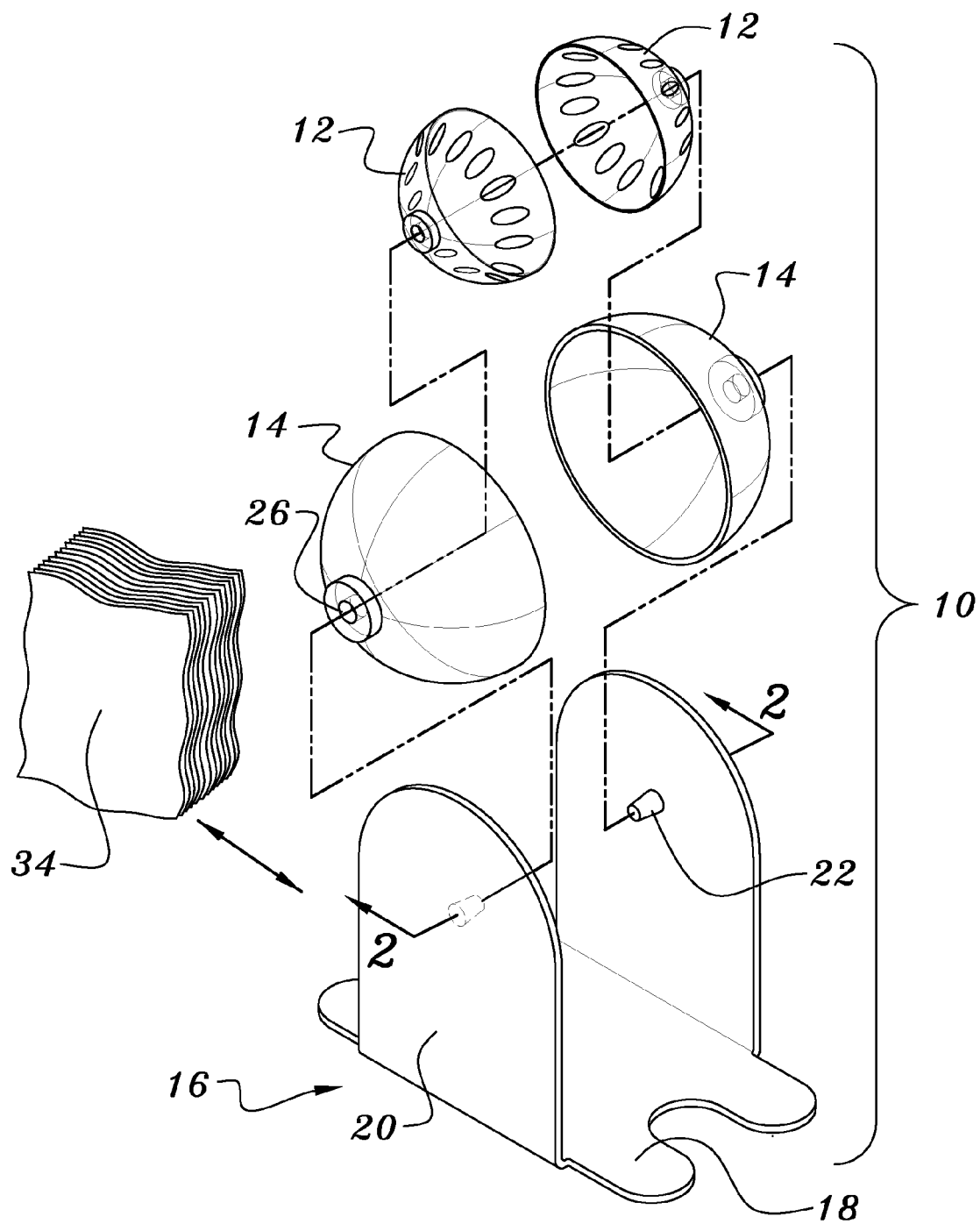
FIG. 1 is an exploded view of apparatus of the invention.

Preferred food drying apparatus of the invention 10 comprises a pair of colanders 12, a pair of preferably transparent bowls 14 and a bifurcated base 16 comprising a horizontally extensive bottom portion 18 and two upstanding vertical portions 20, each of which has an inwardly projecting spindle 22 on a respective inside face.

The two spindles 22 define an axis of rotation 24 about which bowls and colanders may be spun to centrifugally expel superficial water from lettuce or other salad ingredients.

Each of the bowls 14 comprises a respective dimple 26 for receiving one of the spindles 22 so as to retain the bowl assembly during spinning.

The two bowls 14 are sufficiently similar in shape and size so that the rims of the bowls can be joined together to form a symmetrical chamber 28 that can be spun smoothly about the axis 24. In a preferred embodiment the bowls are substantially identical except for their rims, which are designed to allow the bowls to fit together and form a substantially water-tight joint. The bowl rims may have a tongue 30 and groove 32 structure, or may have any other of a variety of known interlocking arrangements Moreover, although the bowls 14 are depicted in the drawing as having a conventional oblate hemispherical shape with a flattened base region, those skilled in the art will appreciate that many other geometries may be used and that these include, but are not limited to faceted bowls and bowls having no flattened base region.

Figure 2:
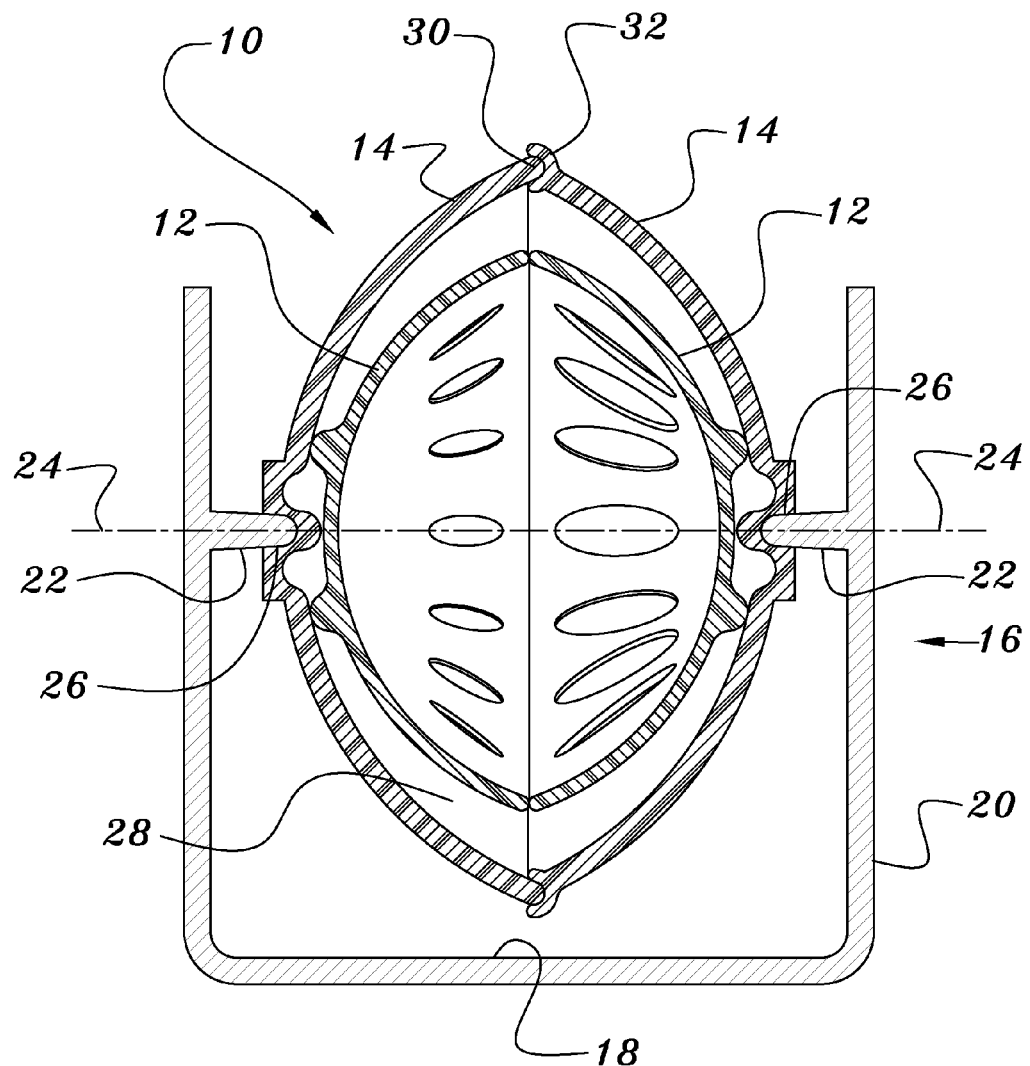
FIG. 2 is a vertical cross-sectional view of assembled apparatus of the invention, the section indicated by lines 2—2 in FIG. 1.

Similarly, the two colanders 12 are preferably substantially identical. Because the colanders 12 are received within the chamber 28 and preferably have a size allowing them to be snugly clamped together between the bowls, the matter of rim design is less important than it is for the bowls. That is, the colanders may, or may not, have interlocking rims. Moreover, the colander size and shape is preferably selected so as to leave enough space between the bowls and the colanders to hold whatever superficial water is expelled during a spin-drying operation. In this arrangement the contents of the colander, in the view of FIG. 2, are above the expelled water.

When used for drying food, such as washed salad ingredients from which superficial water is to be removed, the food is placed between the two colanders 12, which are then nested within the chamber 28 defined by the two bowls 14. The rims of the bowls are then mated together and the assembly so formed is mounted in the base 16 by putting the spindles 22 into the respective spindle-receiving dimples 26. In a preferred embodiment, the base 16 is made with resilient upstanding portions 20 that can be easily forced apart to allow insertion of the bowl and colander assembly, and that then spring back into a normal resting position to hold the bowl assembly on the spindles so that it can be spun about the axis 24. Those skilled in the art will recognize that there are many other approaches for moving spindles into operable contact with a bowl assembly and that these include, but are not limited to arrangements in which spindles extending from rigid supports are moved into operable contact with a bowl assembly by the use of a feed screw (not shown).

In preferred embodiments the bowls 14 are formed from a transparent plastic material so that an operator can watch the spinning operation and determine when it is completed. Embodiments of this sort provide a bowl that is not only suitable for spinning salad ingredients, but that is also of a size, shape, and appearance suitable for serving a mixed green salad.

As noted above, the base 16 preferably comprises two upstanding resilient portions 20. Each of the upstanding portions 16 supports a respective spindle 22 at a suitable height above the bottom, which provides an adequate clearance when used with the preferred bowl assembly described above. The bottom 18 of the base is selected to extend far enough in a direction perpendicular to the axis of rotation so as to provide adequate stability for the spinning bowl assembly. Such choices of size and shape for the base 16 allow the base to be used as a holder for a stack of napkins 34 that can be retained between the resilient upstanding portions of the base.

Apparatus of the invention can be used to spin dry salad ingredients, to mix the dried ingredients with a dressing and to then serve the resultant salad. A process of doing this comprises the steps of capturing the ingredients between the two colanders; joining the rims of the two bowls so as to capture the colander assembly within the chamber defined by the joined bowls; jointly rotating the two joined bowls and colanders about the rotational axis to expel water from the ingredients; separating the two joined bowls and removing both the water and the colanders; placing the ingredients and the salad dressing in one of the bowls; joining the two bowls so as to capture the ingredients and the dressing within the chamber; rotating the two joined bowls about the rotational axis to toss the dressing with the ingredients and to thereby form the salad; separating the two bowls so that the salad is retained in one of them and then serving the salad in that bowl.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A drying apparatus for removing superficial water from washed salad ingredients, the apparatus comprising:
    two bowls having respective rims that, when joined together, define a first chamber having a selected diameter perpendicular to a common axis of the two bowls, each of the bowls having a spindle-receiving dimple on a respective bottom surface distal from the respective rim;
    two colanders that, when joined together and received within the first chamber, define a second chamber;
    a bifurcated base comprising two parallel upstanding portions separated by a horizontal portion, each of the upstanding portions comprising a spindle portion receivable in a respective one of the dimples.

2. The drying apparatus of claim 1 wherein the base has separate utility as a napkin holder.

3. The drying apparatus of claim 1 wherein at least one of the bowls is transparent.

4. The drying apparatus of claim 1 wherein the two colanders are substantially identical.

5. A method of making a dressed salad from at least one salad ingredient and a salad dressing, the method comprising the steps of
    providing two colanders;
    providing two bowls forming a closed chamber for receiving the colander assembly therewithin, the closed chamber rotatable about a common axis of the bowls when their respective rims are joined;
    capturing the at least one ingredient between the two colanders;
    joining the rims of the two bowls so as to capture the colanders within the chamber;
    jointly rotating the two joined bowls and the colanders about the common axis to expel water from the at least one ingredient;
    separating the two joined bowls and removing both the water and the colanders;
    placing the at least one ingredient and the salad dressing in one of the bowls;
    joining the two bowls so as to capture the at least one ingredient and the dressing within the chamber; and
    rotating the two joined bowls about the common axis to toss the dressing with the at least one ingredient so as to form the dressed salad.

6. The method of claim 5 further comprising a step after forming the salad of serving the dressed salad so formed in one of the bowls.

7. The method of claim 5 wherein at least one of the bowls is transparent and the method comprises an additional step, subsequent to the step of rotating the two joined bowls and the colander assembly, of viewing the amount of expelled water.

8. An apparatus for mixing and serving food, the apparatus comprising, in combination:
    a bifurcated base comprising two parallel upstanding portions separated by a horizontal portion, the upstanding portions comprising respective spindle portions extending horizontally towards each other so as to define an axis of rotation;
    two bowls having respective rims that, when joined together, define a chamber rotatable about the axis of rotation to mix the food when the spindle portions of the base are received in respective dimples disposed in respective bottom surfaces of the bowls; and
    napkins, retained between the upstanding portions of the base when the mixed food is served in one of the bowls.

9. The apparatus of claim 8 further comprising two substantially identical colanders that, when joined together, define a colander assembly receivable within the chamber.

\* \* \* \* \*